J. A. WILSON.

Sheet-Metal Cans.

No. 7,923. Reissued Oct. 23, 1877.

Witnesses

Forde R. Smith

H. B. Spencer

John A. Wilson Inventor

By Munday & Evarts his Attorneys

UNITED STATES PATENT OFFICE.

JOHN A. WILSON, OF CHICAGO, ILLINOIS.

IMPROVEMENT IN SHEET-METAL CANS.

Specification forming part of Letters Patent No. 161,848, dated April 6, 1875; Reissue No. 7,923, dated October 23, 1877; application filed October 15, 1877.

*To all whom it may concern:*

Be it known that I, JOHN A. WILSON, of Chicago, in the county of Cook, and in the State of Illinois, have invented certain new and useful Improvements in Metallic Cans for Containing Cooked Meats; and do hereby declare that the following is a full, clear, and exact description thereof, reference being had to the accompanying drawings, and to the letters of reference marked thereon, making a part of this specification.

My invention relates to hermetically-sealed cans used in packing meats or other articles; and it consists in a pyramidal-shaped can, having rounded corners, and both ends slightly flaring to form shoulders, against which the head or end pieces rest, as will be hereinafter more fully set forth.

In order to enable others skilled in the art to which my invention appertains to make and use the same, I will now proceed to describe its construction and operation, referring to the annexed drawing, in which—

Figure 1:
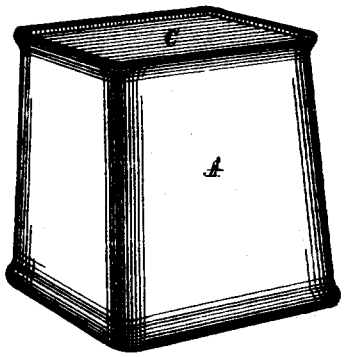
Figure 2:
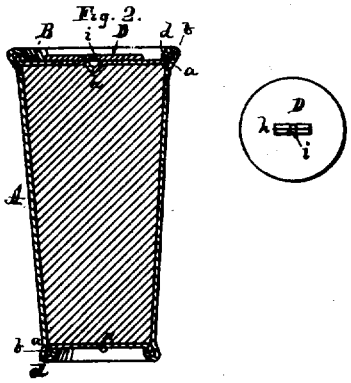

Figure 1 is a perspective view of my can. Fig. 2 is a transverse vertical section of the same, reversed.

*a* represents the body of my can, made in the form of a truncated pyramid, with rounded corners, and of any desired number of sides, though I prefer to make with four sides. Both ends of the body are made slightly flaring, as shown, so as to form interior shoulders or offsets *a*, against which the heads B and C are to rest. The edges of these heads are turned outward, as shown at *b*, and the flaring edge *d* of the end of the can is turned inward over the flange *b*, and the three thicknesses of metal pressed together by machinery, with or without solder, so as to make air-tight joints.

In packing cooked meats, it is done by means of a plunger through an aperture in the large head B, which opening is afterward hermetically sealed by means of a cap or plate, D. In the plate D is a vent or opening, *i*, to allow the air or gases to escape that are generated while hermetically sealing the can; and to prevent the meat from closing said vent, it is protected by means of a trough or gutter, *h*, attached to the under side of the plate, which trough is open at both ends; or, in place of this trough, a perforated diaphragm may be used to answer the same purpose. The can is to be opened at the larger end, at or near the shoulder *a*, by means of a suitable can-opener, so that when the can is reversed again a slight tap on the smaller head C will cause the solidly-packed meat to slide out in one piece, so as to be readily sliced, as desired.

Having thus fully described my invention, what I claim as new, and desire to secure by Letters Patent, is—

1. A can for packing food, hermetically sealed, and constructed of pyramidal form, with rounded corners and offset ends to support the heads, said heads being secured as shown and described.

2. The perforated plate D, in combination with head B or C, provided with protector *h*, substantially as and for the purpose set forth.

3. As an improved article of manufacture, solid meat compressed and secured within a pyramidal case or can, so that said can forms a mold for the meat and permits its discharge as a solid cake, substantially as specified.

JOHN A. WILSON.

Witnesses:

EDWARD S. EVARTS,
FORDE R. SMITH.